United States Patent [19]

Iijima

[11] Patent Number: 5,225,664
[45] Date of Patent: Jul. 6, 1993

[54] MUTUAL AUTHENTICATION SYSTEM

[75] Inventor: Yasuo Iijima, Yokohama, Japan

[73] Assignee: Kabushiki Kaisha Toshiba, Kawasaki, Japan

[21] Appl. No.: 648,049

[22] Filed: Jan. 30, 1991

[30] Foreign Application Priority Data

Jan. 30, 1990 [JP] Japan ................. 2-17921
Jan. 30, 1990 [JP] Japan ................. 2-17922

[51] Int. Cl.$^5$ ................................. G06F 15/00
[52] U.S. Cl. ................... 235/380; 235/382; 235/492; 340/825.34; 380/23
[58] Field of Search ............. 235/379, 380, 382, 492; 380/23, 24, 25; 340/825.34

[56] References Cited

U.S. PATENT DOCUMENTS

| | | | |
|---|---|---|---|
| 4,268,715 | 5/1981 | Atalla | 235/379 |
| 4,450,024 | 5/1984 | Haghiri-Tehrani et al. | 156/108 |
| 4,617,216 | 10/1986 | Haghiri-Tehrani et al. | 428/67 |
| 4,746,788 | 5/1988 | Kawana | 380/23 |
| 4,786,790 | 11/1988 | Kruse et al. | 235/380 |
| 4,799,061 | 1/1989 | Abraham et al. | 235/379 |
| 4,849,927 | 7/1989 | Vos | 380/23 |
| 4,862,501 | 8/1989 | Kamitake et al. | 235/380 |
| 4,935,962 | 6/1990 | Austin | 235/380 |
| 4,961,142 | 10/1990 | Elliott et al. | 235/380 |
| 5,017,766 | 5/1991 | Tamada et al. | 380/23 |
| 5,109,152 | 4/1992 | Takagi et al. | 235/380 |

FOREIGN PATENT DOCUMENTS 2920012 5/1979 Fed. Rep. of Germany.
3111516 12/1982 Fed. Rep. of Germany.

*Primary Examiner*—Eugene R. LaRoche
*Assistant Examiner*—Tan Nguyen
*Attorney, Agent, or Firm*—Cushman, Darby & Cushman

[57] ABSTRACT

When mutual authentication is effected between an IC card and a host device, key data and random number data transmitted from the host device are immediately subjected to the encrypting process without storing the same into a RAM of the IC card, and only authentication data obtained as the result of the encrypting process is stored. As a result, the memory area in the RAM can be saved and effectively used.

19 Claims, 9 Drawing Sheets

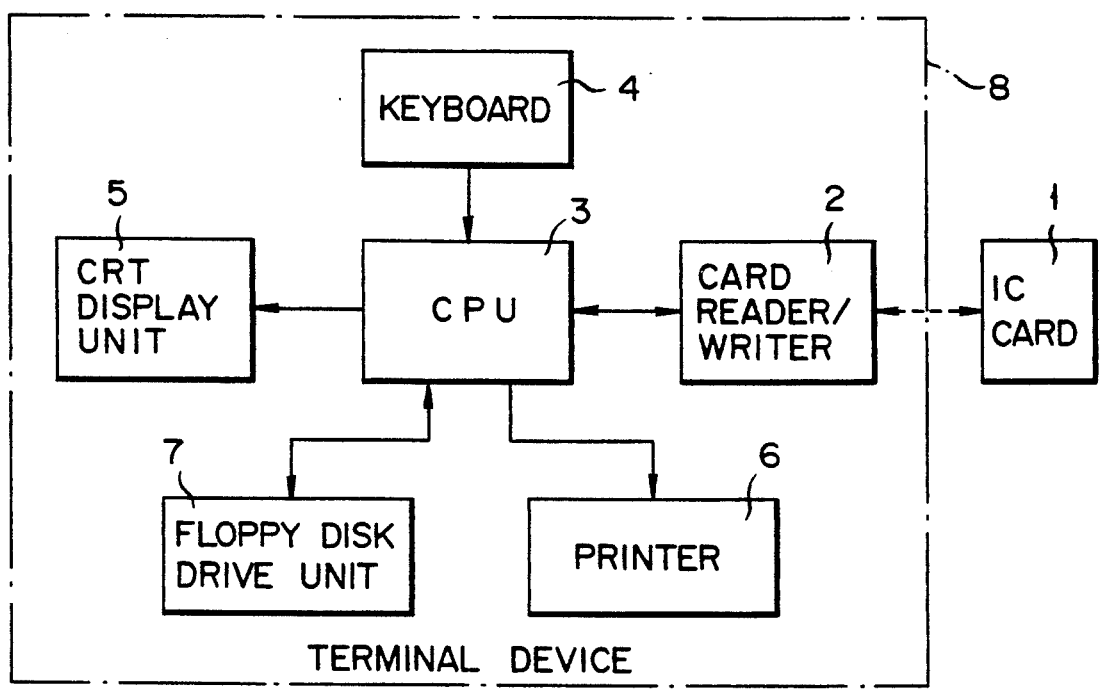
F I G. 1
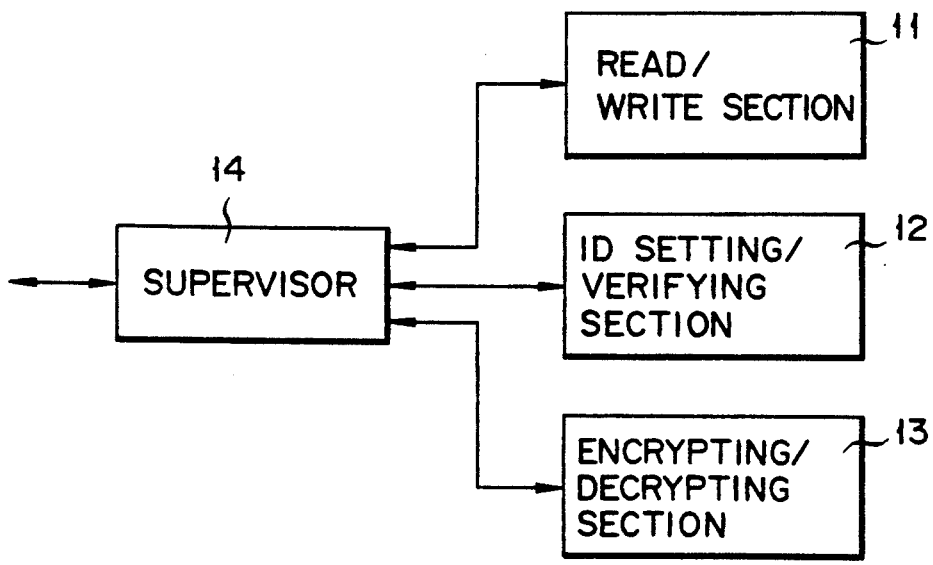
F I G. 2

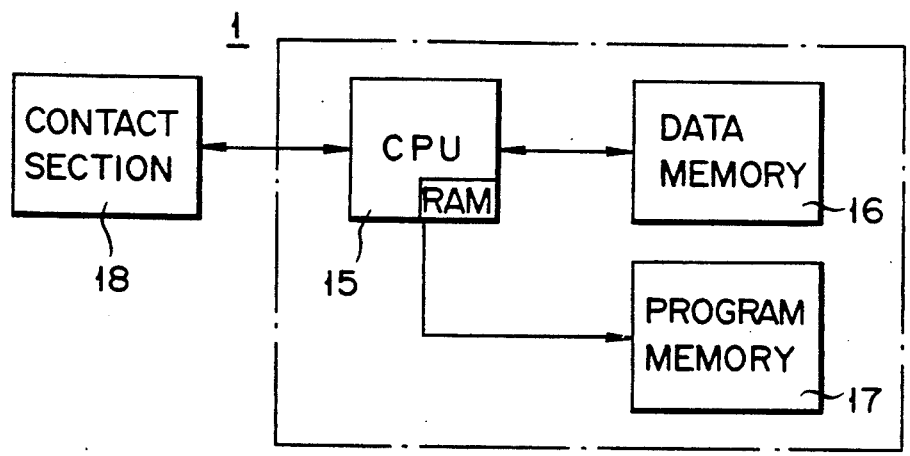
F I G. 3
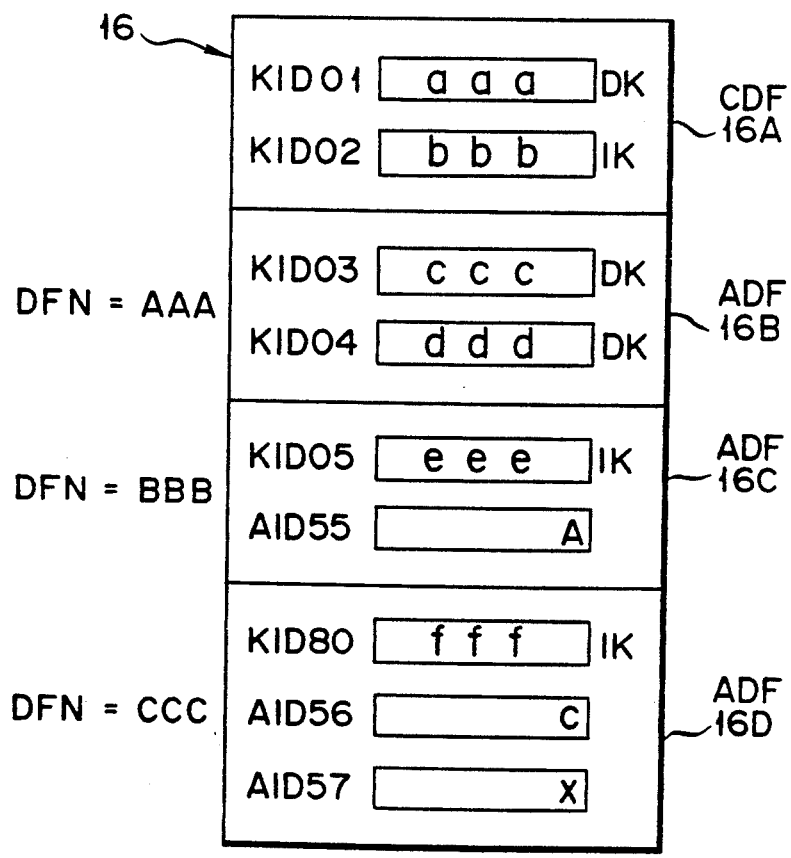
F I G. 4

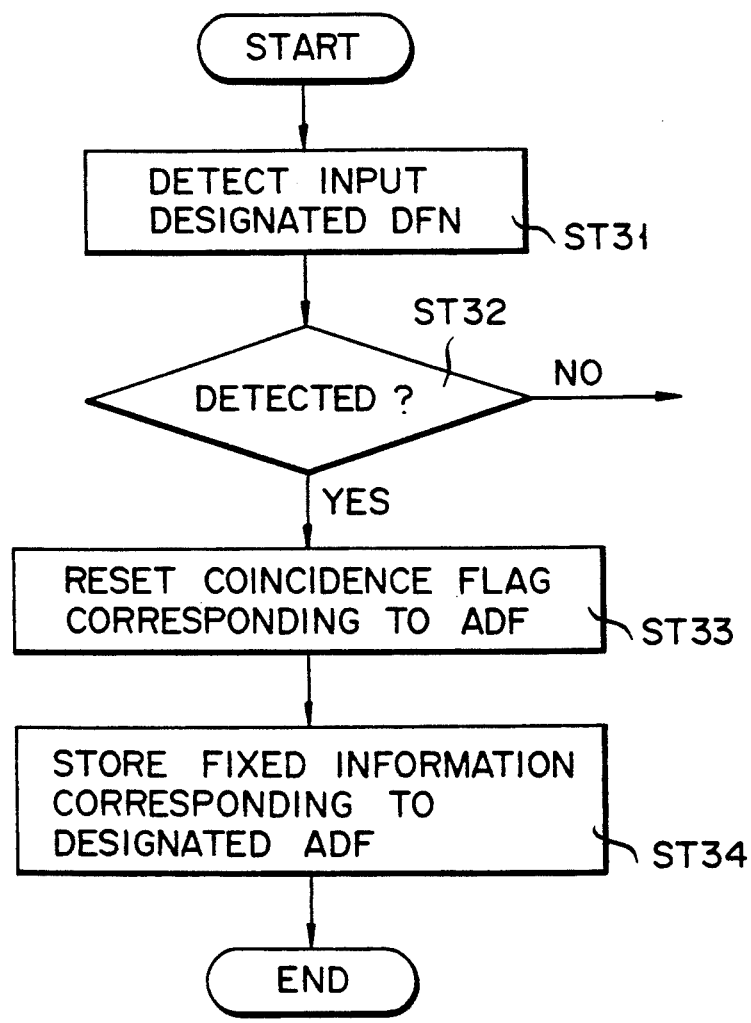
F I G. 9

MUTUAL AUTHENTICATION SYSTEM

BACKGROUND OF THE INVENTION

1. Field of the Invention

This invention relates to a system for effecting mutual authentication between a portable type electronic device such as an IC card having an IC (integrated circuit) chip enclosed therein and a host device or terminal device.

2. Description of the Related Art

In order to effect the mutual authentication between the IC card and host device, first authentication data and first key data stored in the IC card are transferred to the host device and stored therein, second authentication data and second key data stored in the host device are transferred to the IC card and stored therein, and the second and first authentication data are encrypted by use of second and first key data, and supplied back to the host device and the IC card, respectively, for authentication.

As described before, in the mutual authentication system with the above construction, memory areas for holding four different types of data, that is, first authentication data and first key data to be transferred to the host device and second authentication data and second key data transferred from the host device must be provided in, for example, a RAM of a CPU in the IC card. Likewise, memory areas for holding four different types of data must be provided in a CPU in the host device.

SUMMARY OF THE INVENTION

An object of this invention is to provide a mutual authentication system which is so constructed that an amount of data to be held can be reduced and a memory area can be effectively used to hold other data.

According to this invention, the above object can be attained by a mutual authentication system for authenticating a first electronic device and a second electronic device by transmitting authentication data between the first and second electronic devices, comprising: a first means provided in said first electronic device for transmitting first and first key designating data to said second electronic device; a second means provided in said first electronic device for generating first authentication data according to the first data and first key data; a third means provided in said second electronic device for storing a plurality of key data; a fourth means provided in said second electronic device for generating second authentication data according to the first data and one of the plurality of key data designated by first key designating data; a fifth means provided in said first electronic device for comparing the first authentication data with the second authentication data generated by said fourth means; and a holding means provided in said first electronic device for holding the first authentication data generated by said second means prior to an execution of said fifth means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing one embodiment of a mutual authentication system according to this invention;

FIG. 2 is a function block diagram of an IC card shown in FIG. 1;

FIG. 3 is a block diagram showing the internal construction of the IC card shown in FIG. 1;

FIG. 4 is a diagram schematically showing memory areas of a data memory in the IC card;

FIGS. 6 to 10 are flowcharts for explaining the operation of the mutual authentication system of the above embodiment.

DETAILED DESCRIPTION OF THE PREFERRED EMBODIMENTS

Figure 5A:
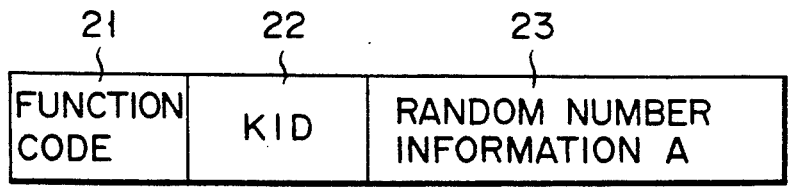
FIGS. 5A to 5E are diagrams showing the formats of various commands input to the IC card.

There will now be described an embodiment of this invention with reference to the accompanying drawings.

FIG. 1 shows an example of the construction of a terminal device 8 (one of two electronic devices) used as a host device for dealing with an IC card (the other of the two electronic devices) used as a portable type electronic device according to this invention. That is, the terminal device 8 permits an IC card 1 to be connected to a CPU 3 functioning as a control section via a card reader/writer 2 and is constructed by connecting a keyboard 4, CRT display unit 5, printer 6 and floppy disk drive unit 7 to the CPU 3.

The IC card 1 is held by a user and is used to verify an identification number which is known only to the user and to store necessary data at the time of transaction such as purchase of articles. As is clearly seen from the function block thereof shown in FIG. 2, it is constructed by sections for effecting basic functions including a read/write section 11, identification number (ID) setting/verifying section 12 and encrypting/decrypting section 13 and a supervisor 14 for controlling the basic functions. The read/write section 11 has a function of reading data from, writing data into or erasing data from a data memory 16 to be described later. The ID number setting/verifying section 12 has a function of permitting an ID number set by the user to be stored and preventing the same from being read out and verifying the ID number after the ID number is set so as to permit the succeeding process to be effected. The encrypting/decrypting section 13 encrypts data for preventing leakage and forgery of the communication data when data is transmitted from the CPU 3 to another terminal device via a communication network, for example, and decrypts the encrypted data. The supervisor 14 decodes a function code input from the card reader/writer 2 or a function code with data and selects and effects necessary functions among the basic functions.

In order to effect the above various functions, the IC card 1 is constituted by a CPU 15 used as a control element, data memory 16, program memory 17 and contact section 18 for electrical connection with the card reader/writer 2 as shown in FIG. 3 and those (CPU 15, data memory 16, program memory 17) of the elements which lie inside an area defined by broken lines are formed on one IC chip (or a plurality of IC chips) and buried inside the main body of the IC card 1. The CPU 15 includes an internal memory, RAM.

The program memory 17 is constituted by a mask ROM for storing a control program of the CPU 15 having a subroutine for effecting the above basic functions, for example.

The data memory 16 is used to store various data and is constituted by an erasable nonvolatile memory such as an EEPROM.

As shown in FIG. 4, for example, the data memory 16 is constituted by a common data file (which is hereinafter referred to as a CDF) 16A commonly used for all of the applications and a plurality of application data files (which are hereinafter referred to as ADFs) 16B, 16C, 16D used for respective applications and data file names (DFNs) are respectively given to the ADFs 16B, 16C, 16D.

In the example of FIG. 4, The CDF 16A contains designation key data (DK) aaa indicated by a key data number KID01 and internal key data (IK) bbb indicated by a key data number KID02, and the ADF 16B indicated by DFN=AAA contains designation key data (DK) ccc indicated by a key data number KID03 and designation key data (DK) ddd indicated by a key data number KID04. Further, the ADF 16C indicated by DFN=BBB contains internal key data (IK) eee indicated by a key data number KID05 and a data area indicated by an area number AID55. Particularly, the data area includes attribute information for permitting access when correct authentication is obtained in the authentication process by use of the internal key data (IK) in the ADF 16C. Further, the ADF 16D indicated by DFN=CCC contains internal key data fff indicated by a key data number KID80, a data area indicated by an area number AID56 and a data area indicated by an area number AID57. Particularly, the data area indicated by the area number AID56 includes attribute information for permitting access when correct authentication is obtained in the authentication process by use of the internal key data (IK) in the CDF 16A, and the data area indicated by the area number AID57 includes attribute information for permitting access when correct authentication is obtained in the authentication process by use of the internal key data (IK) in the CDF 16A or internal key data (IK) in the ADF 16D.

The designation key data (DK) is used by the terminal device 8 for authenticating the IC card 1, and the internal key data (IK) is used by the IC card 1 for authenticating the terminal device 8.

Next, the operation of the IC card 1 is explained with reference to FIGS. 5A to 5E and FIGS. 6 to 11. When the IC card 1 receives a command message shown in FIG. 5A from the terminal device 8, it executes a mutual authentication preparation operation for the IC card and terminal device shown in FIG. 6 based on a function code 21 contained in the message. The process is executed by the CPU 15 according to the program stored in the program memory 17. First, in step ST1, random number data A is generated in the terminal 8 from which data "EXCH (ALG, KID-03, A)" is transmitted to the IC card 1. The data "ALG" represents a number times of the algorithm is executed by the IC card 1. Then, it is determined in the step ST1 by referring to selection ADF fixed information in the internal RAM (RAM in the CPU 15) whether or not the ADFs 16B to 16D have been selected. At this time, if they have not been selected, that is, if "NO" in the step ST1, a key data number (KID) 22 of the input command message is detected from the CDF 16A in the data memory 16 in the step ST2. If they have already been selected, that is, if "YES" in the step ST1, the KID 22 is detected in the CDF 16A and the selected ADF in the step ST3. In the step ST3, the random data A is stored in a RAM of the IC card 1. If it is not detected at this time, an error status is output in the step ST4.

If the KID is detected, corresponding key data is internally read in the step ST5 and it is checked whether it is correct or not. At this time, if it is not correct, an error status is output. If it is correct, the next step ST6 is effected to store random number information A in the area 23 of the command message and the corresponding key data into a preset area of the internal RAM of the CPU 15. Next, random number information B is generated in the step ST7 according to a preset algorithm based on the random number information A, a number which is inherent to the card and set when the card is issued and card random number information stored as an initial value in the data memory 16, and the random number information B is stored into the data memory 16 as new card random number information in the step ST8.

Next, it is determined in the step ST9 whether the ADFs have been selected or not, and if they have not been selected, a KID in the internal key data is detected by the CDF 16A in the next step ST10 and if they have been selected, a KID is detected in the CDF 16A and the selected ADF in the step ST11 (in this case, ADF is treated in preference to CDF). If the KID is not detected, an error status is output in the step ST12 shown in FIG. 7. If it is detected, corresponding key data is internally read in the next step ST13 and whether the key data is correct or not is checked. At this time, if it is not correct, an error status is output.

If the key data is correct, the step ST14 is effected to encrypt the previously generated random number information B by using the detected internal data NNNNN as an encryption key, and the result is stored into a preset area of the internal RAM as authentication information C2X. Then, the data=each (ALG, KID-04, B) including the random number information B and KID of the internal key data are transmitted to the terminal 8 in the step ST15 and this flow control is completed.

According to the above flow control, key designation information and random information used for mutual authentication between the terminal device 8 and IC card 1 can be commonly used.

Figure 5B:
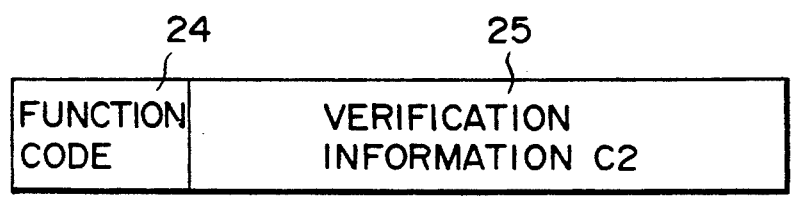
Figure 8:
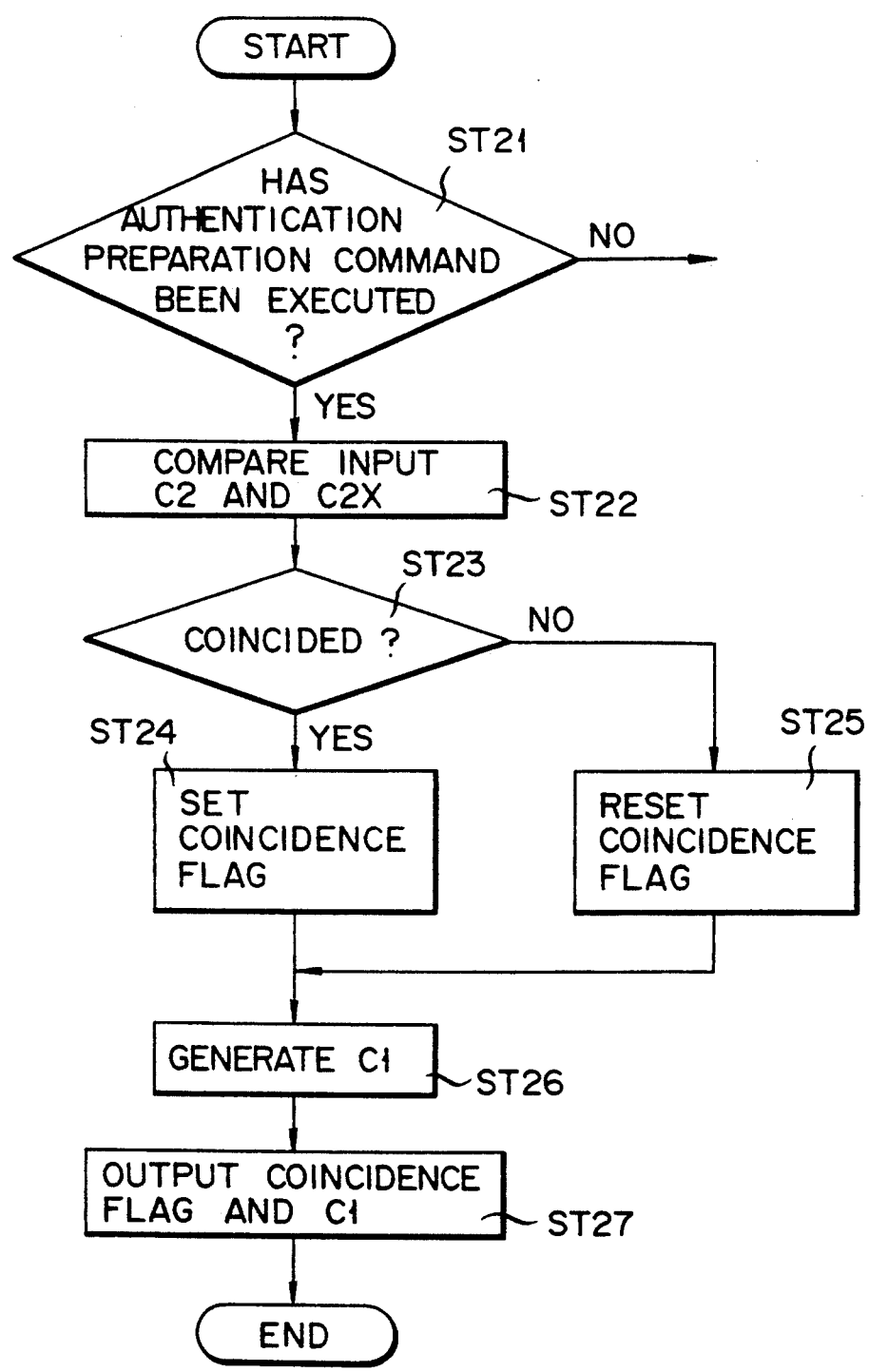

Next, when a command message of FIG. 5B is received, the flow control shown in FIG. 8 is selected according to the function code 24 thereof and effected. That is, it is first checked in the step ST21 whether the mutual authentication preparation command described before has been executed or not and if it has not been executed, then an error status is output. In step ST22, an encryption of random data B using key data NNNNN is executed in the terminal 8 to obtain an encrypted data C2 which is then transmitted to the IC card 1.

If the mutual authentication preparation command has been executed, authentication information C2 25 in the subsequently input message and authentication information C2X stored in the internal RAM are compared with each other in the step ST22, and if it is detected in the step ST23 that they coincide with each other, a coincidence flag is set to the ON state in the step ST24. If "NO" is obtained in the step ST23, the coincidence flag is set to the OFF state in the step ST25. At this time, an encryption of the random data A is performed using key data MMMMM in the IC card 1 to obtain encryption data C1 which is transmitted to terminal 8. At this time, the ADF-corresponding coincidence flag or CDF-corresponding coincidence flag is set to the ON or OFF state according to whether the internal key data belongs to the ADF or CDF. Next, in the terminal 8, the random information A 23 previously stored in the internal RAM is encrypted by using the designation key data MMMMM as an encryption key in the step ST26 and the result data C1X is output as authentication information C1X together with the result of the previous coincidence flag in the step ST27 and this flow control is completed. In step ST27, the data C1 is compared with the data C1X to see whether they are coincident or not.

By this flow control, the mutual authentication of the IC card with the terminal device 8 can be attained.

Figure 5C:
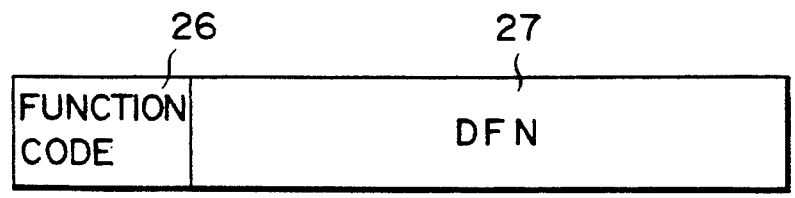

Next, when a command message of FIG. 5C is received, an ADF selection flow of FIG. 9 is selected according to the function code 26 and effected. That is, it is first checked in the step ST31 whether DFN 27 included in the message is registered in the data memory 16 of the IC card 1, and if it is not registered, an error status is output in the step ST32.

If it is registered, the ADF-corresponding coincidence flag among the coincidence flags of the C2/C2X is set to the OFF state in the step ST33. Next, fixed information corresponding to the designated DFN is held in the internal RAM in the step ST34 and a correct completion status is output.

Figure 5D:
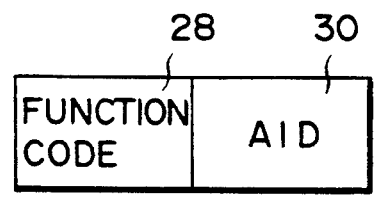
Figure 5E:
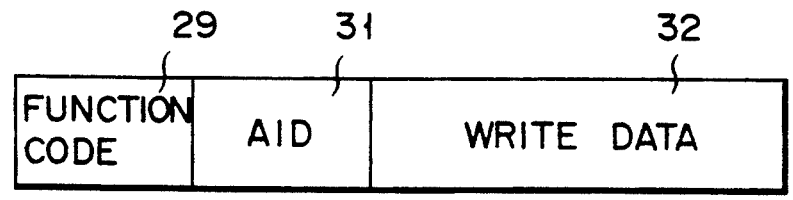
Figure 6:
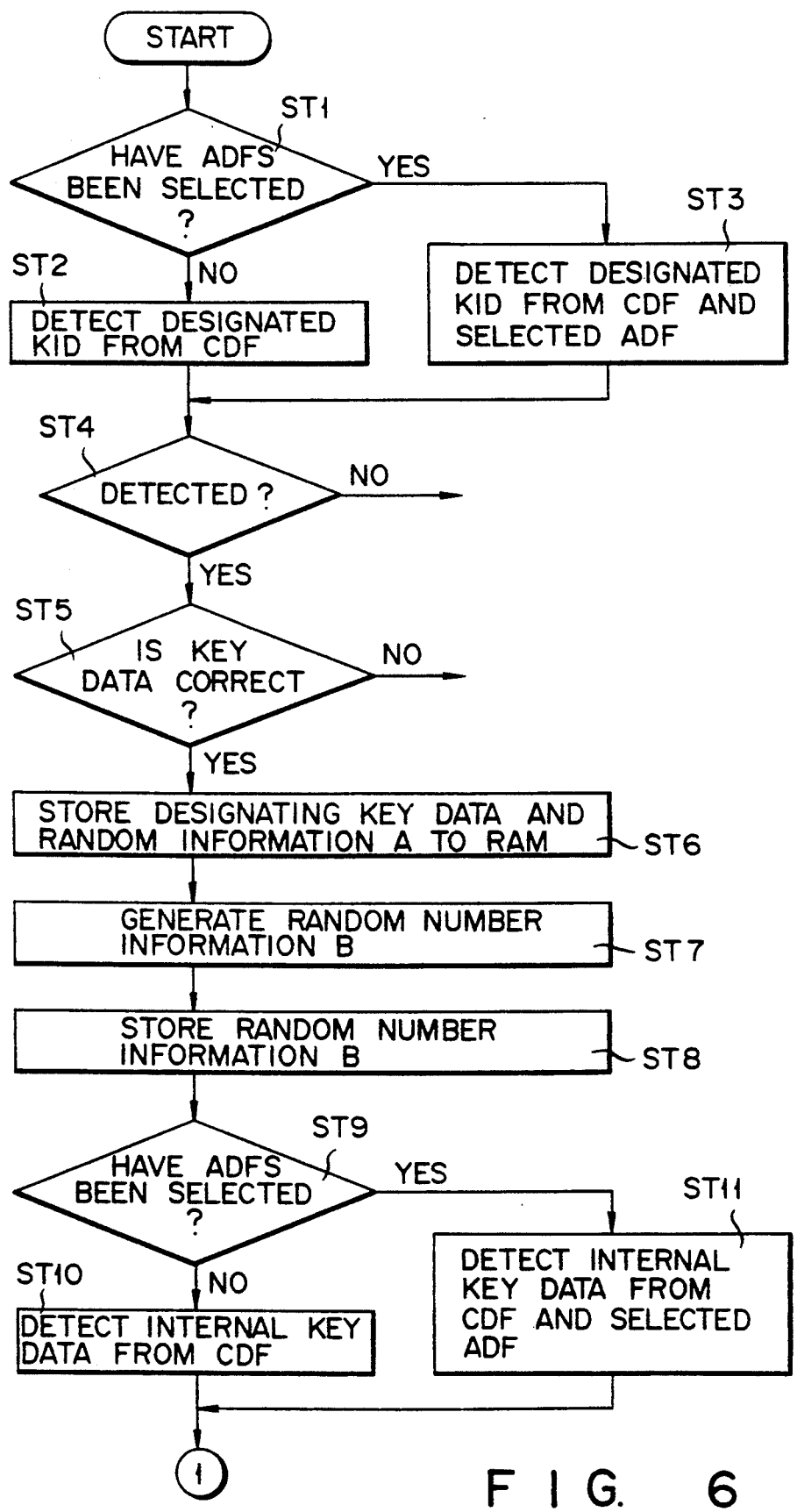
Figure 7:
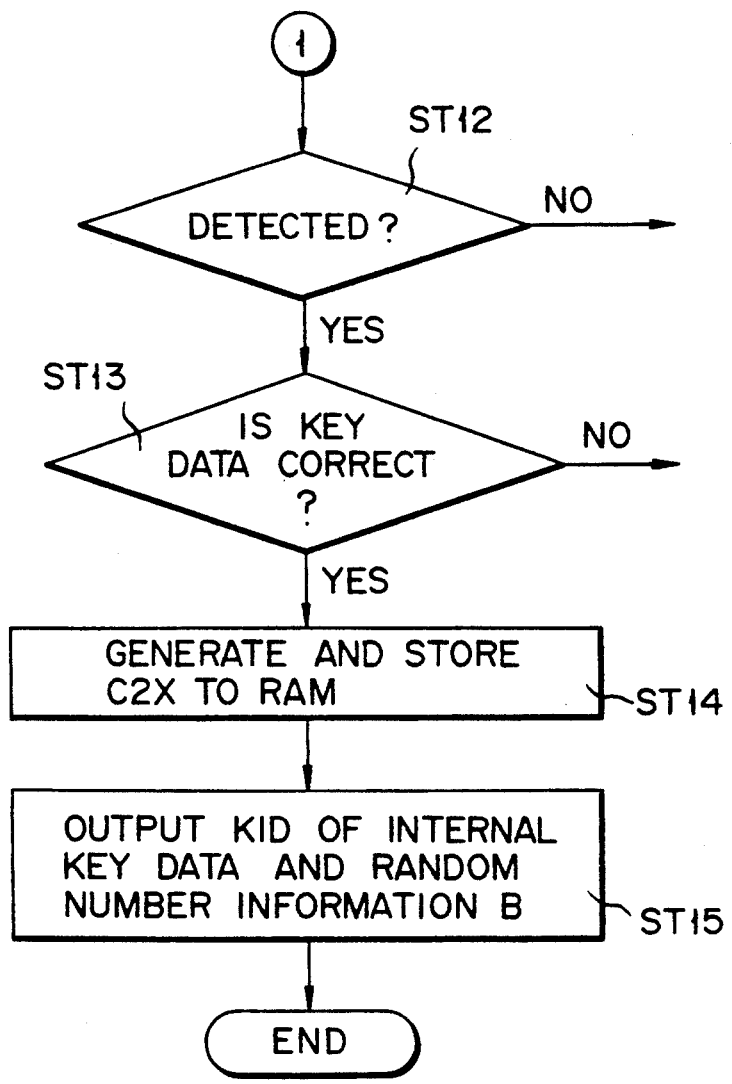
Figure 10:
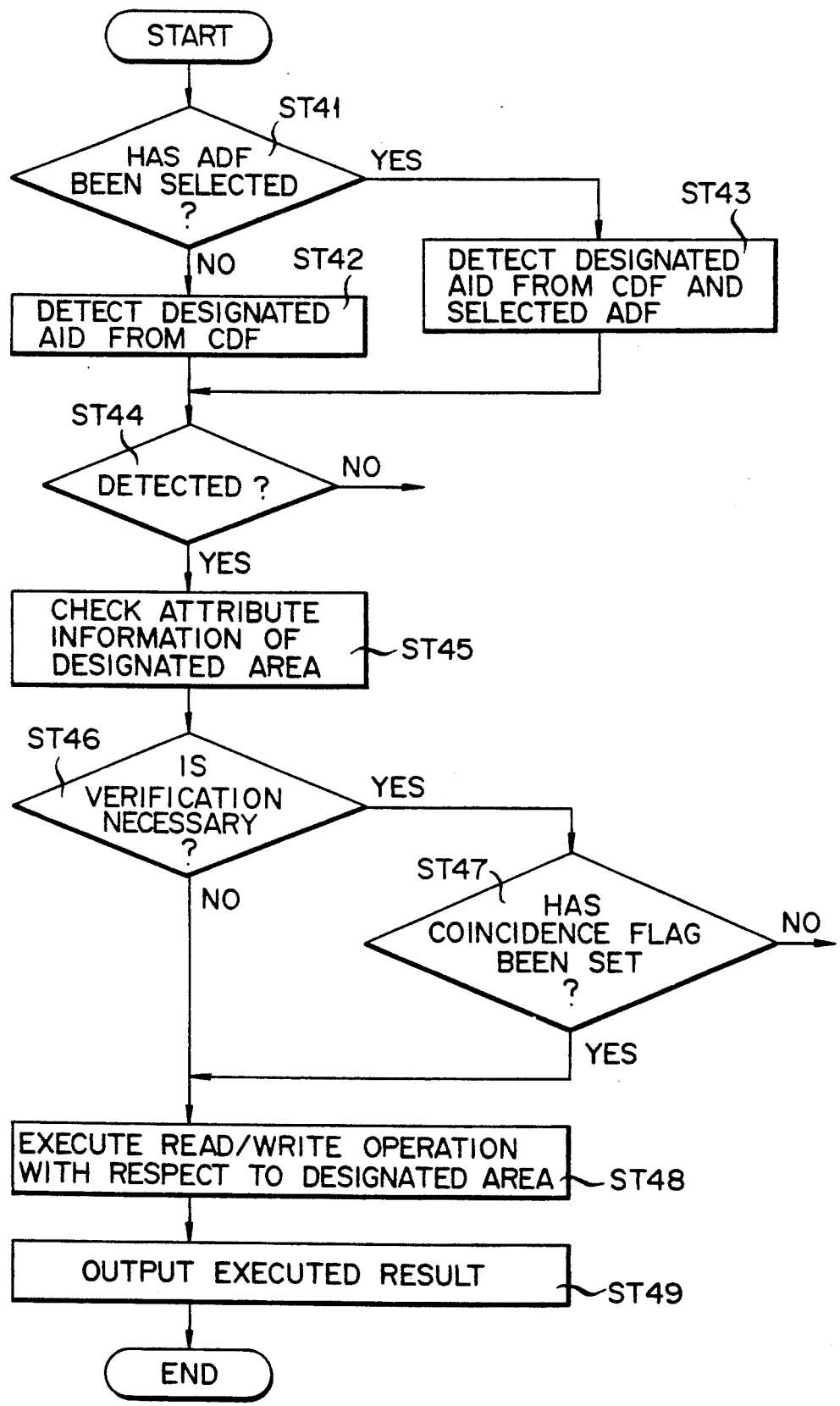
Figure 11:
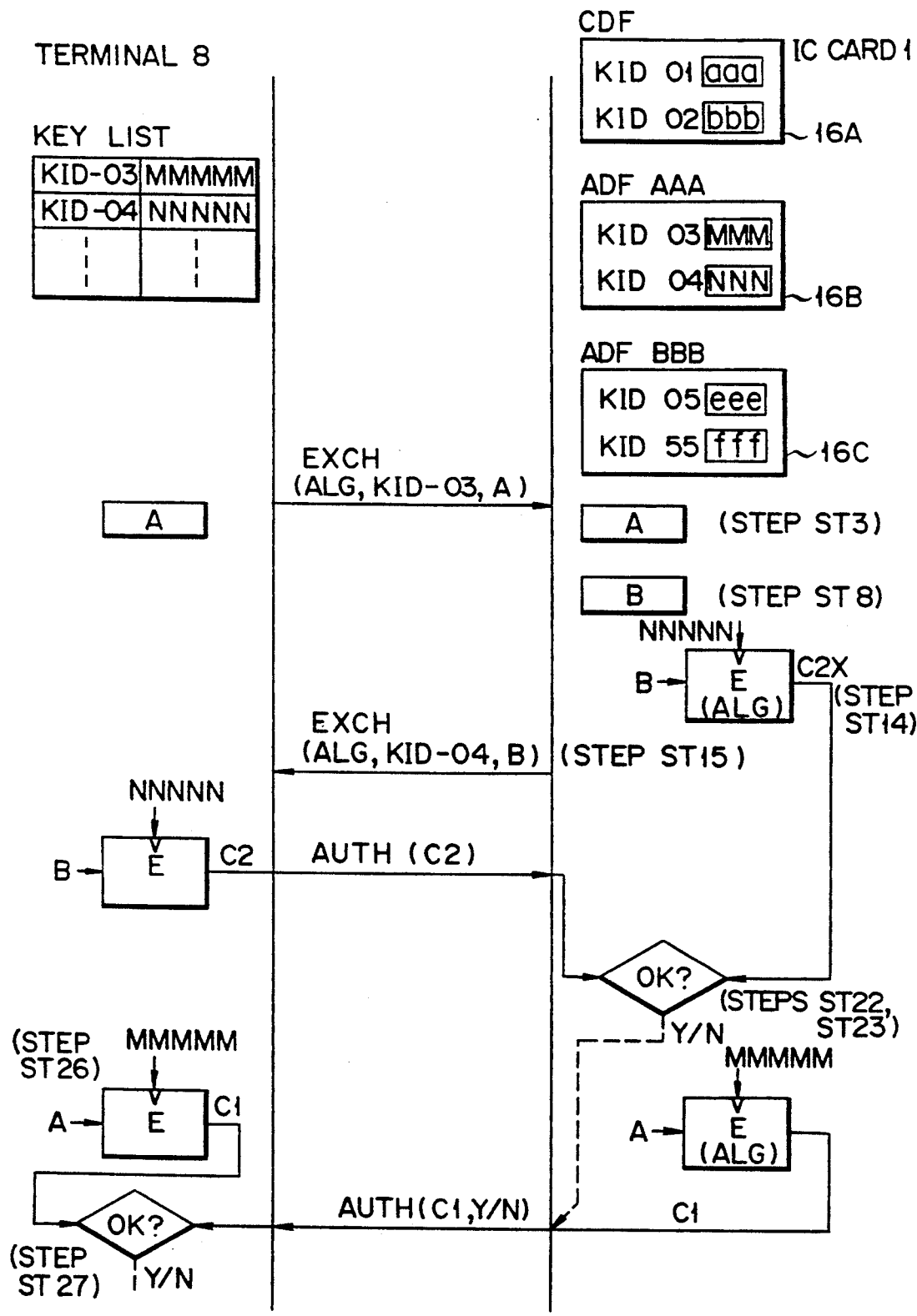
FIG. 11 is a schematic diagram of the mutual authentication system according to the present invention.

Next, a read command message of FIG. 5D or write command message of FIG. 5E is received, the flow control of FIG. 10 is selected according to the function code 28 or 29 and effected. That is, it is first checked in the step ST41 whether the ADF has been selected or not, and if it has not been selected, an area identification number (AID) 30 or 31 in the input message is detected from the CDF 16A in the step ST42. If it has been selected, designated AID is detected in the selected ADF and CDF 16A in the step ST43. At this time, if there is no AID detected, an error status is output in the step ST44.

If the designated AID is detected, it is checked in the step ST46 whether or not it is necessary to determine the previous coincidence flag by referring to the attribute information stored in the corresponding designated area in the step ST45. If necessary, it is determined whether it is a ADF-corresponding coincidence flag or CDF-corresponding coincidence flag, or it can be either of them.

If the ADF-corresponding coincidence flag is necessary or it can be either of them, the ADF-corresponding coincidence flag is referred to in the step ST47 and it is checked whether it is set in the ON state or not. If it is set in the OFF state, an error status is output.

If the CDF-corresponding coincidence flag is necessary or it can be either of them, the CDF-corresponding coincidence flag is referred to and it is checked whether it is set in the ON state or not. If it is set in the OFF state, an error status is output.

Then, a corresponding read or write process is effected in the step ST48 according to the function code 28 or 29 in the message and the result of the process is output in the step ST49.

Next, the operation of the IC card 1 having the construction of the area and key data shown in FIG. 4 is explained. In FIG. 4, the memory areas are arranged as described before, and in this state, key data of KID01 is used as designating key data and key data of KID02 is used as internal key data for mutual authentication in the case where the ADF selection is not effected. In a case where the ADF 16B is selected by DFN=AAA, key data of KID03 or KID04 or key data of KID01 is used as designating key data and key data of KID02 is used as internal key data.

Likewise, in a case where the ADF 16C is selected by DFN=BBB, key data of KID01 is used as specifying key data and key data of KID05 is used as internal key data.

In order to make access to the area of AID55 in the ADF16C, the attribute of the area is so determined as to necessitate internal key data in the ADF. As a result, the mutual authentication must be effected after the ADF 16C is selected. This is because the internal key data used for the mutual authentication is the key data of KID02 if the ADF 16C is selected after the mutual authentication is effected.

Further, for access to the area of AID56 in the ADF16D, the attribute of the area is so determined as to necessitate internal key data in the CDF 16A. As a result, after the mutual authentication is effected, the ADF must be selected and access will be made to the area.

The area of AID57 can be accessed in either case where the ADF 16D is selected before or after the mutual authentication is effected.

Further, access to the area of AID57 cannot be made in a case where the ADF 16C is first selected and then the ADF 16D is selected after the mutual authentication is effected.

As described above, according to the mutual authentication system of this invention, since the encrypting process is effected when two random number data and two key data are prepared according to the first request and only the authentication information obtained as the result of the process is held, the number of data to be held in the process of receiving the second request after the first request has been effected can be reduced, thereby making it possible to effectively use the memory area for other purposes. In particular, this is effective for the IC card having a small RAM area, for example.

The IC card 1 used in the above embodiment is a portable type electronic device capable of generating random number information for mutual authentication even if it has no battery. That is, the IC card used in the above embodiment is a portable type electronic device which includes at least a memory and a control element such as a CPU for accessing the memory and selectively performs an external data transfer and comprises inputting means for inputting first random number data, generating means for encrypting the first random number data to generate second data by using first data and second random number information stored in the memory, rewriting means for setting the second data generated by the generating means as new second random number information, and outputting means for outputting the second data generated by the generating means.

Therefore, data which can be used as the basis for generation of the random number information is read out from the internal memory and the newly generated random number information is stored in the memory so as to be used as data for generation of the next random number information. Further, designated data stored in the memory is set as a parameter for generation of random number information when the electronic device is issued, for example. As a result, even when the same random number information items are input to the portable type electronic device, different data can be generated in each time and different data can be generated in different portable type electronic devices. Therefore, the data can be used as random number information in the system.

Thus, data used as the basis for generation of the random number information is read out from the data memory of the card and newly generated random number information is stored in the data memory so as to be used as data which can be used as the basis for generation of the next random number information. Further, at the time of issuing the card, designated data such as card inherent number stored in the data memory is set as a parameter for generation of random number information. As a result, even when the same random number information items are input to the IC card, different data can be generated in each time and different data can be generated in different IC cards. Therefore, the data can be used as random number information in the system. Thus, the IC card 1 can be used to generate random number information for mutual authentication even if it has no battery.

As described above, it is possible to provide a portable type electronic device which is capable of generating random number information for mutual authentication even if it has no battery.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A mutual authentication method for transmitting authentication data between first and second electronic devices for authenticating with each other, said firs electronic device having a first key data memory storing a plurality of first key data designating data and a plurality of associated key data and said second electronic device having a second key data memory storing second key data designating data and key data identical to those stored in said first key data memory, said method comprising the steps of:
   a) transmitting first authentication base data and first key data designating data to said first electronic device form second electronic device;
   b) generating second authentication base data in said first electronic device in response to said received first authentication base data transmitted in step a);
   c) transmitting said second authentication base data and one of second key data designating data to said second electronic device from said first electronic device;
   d) obtaining first key data in said first electronic device and second key data in said second electronic device in response to said first and second key data designating data, respectively;
   e) generating first authentication data by encrypting said second authentication base data with said first key data in said first electronic device;
   f) generating second authentication data by encrypting said second authentication base data with said second key data designated by said second key data designating data in said second electronic device; and
   g) comparing said first authentication data with said second authentication data transmitted form said second electronic device in said first electronic device.

2. A mutual authentication method according to claim 1, wherein said step c) is performed prior to performing said step e).

3. A mutual authentication method according to claim 20, further comprising the steps of:
   h) generating third authentication data by encrypting said first authentication base data with said first key data designated by said first key data designating data in said first electronic device;
   i) generating fourth authentication data by encrypting said first authentication base data with said first key data in said second electronic device;
   j) transmitting said third authentication data generated in said first electronic device to said second electronic device; and
   k) comparing said fourth authentication data with said third authentication data transmitted from said first electronic device in said second electronic device.

4. A mutual authentication method according to claim 1, wherein:
   said first electronic device comprises storing means including divided memory areas divided corresponding to application objects thereof for storing a plurality of key data corresponding to said key data designating data; and
   said step d) comprises a step of obtaining said first key data form one of said divided memory areas corresponding to one of said application objects.

5. A mutual authentication method according to claim 4, which further comprises a step of controlling said execution of said step k) based on a comparison result of said step g).

6. A mutual authentication method according to claim 4, wherein:
   said storing means stores said first key data and said second key data in said divided memory areas, and
   said step d) comprises a step of obtaining said first key data form said first key data stored by said storing means ;and
   said step e) comprises a step of obtaining said second key data stored by said storing means form one of said divided memory areas corresponding to one of said application objects.

7. A mutual authentication method according to claim 1, wherein said second electronic device comprises storing means for previously storing first random data, and said method further comprises a step of generating, in said first electronic device, second random data based on first random data.

8. A mutual authentication method for authenticating a first electronic device and a second electronic device by transmitting authentication data between said first and second electronic devices, said first electronic device having a first key data memory storing a plurality of first key data designating data and a plurality of associated key data nd said second electronic device having a second key data memory storing second key data designating data nd key data identical to those stored in said first key data memory, said method comprising the steps of:

a) transmitting first authentication base data and one of said first key data designation data form said second electronic device to said first electronic device;
b) generating first authentication data in response to said transmitted first authentication base data and first key data based on said first key data designation data in said first electronic device;
c) generating second authentication data in response to said first authentication base data and said first key data obtained by said first key data designating data in said second electronic device;
d) comparing said first authentication data with said second authentication data transmitted from said second electronic device to said first electronic device, wherein step b) is executed prior to said step d) to hold only said first authentication data;
e) transmitting second authentication base data and one of second key data designating data from said first electronic device to said second electronic device;
f) generating third authentication data in response to said second authentication base data to second key data read from said second key data memory in said second electronic device;
g) generating fourth authentication data in response to said second authentication base data and second key data read from said first key data memory in response to said second key data designating data in said first electronic device;
h) transmitting said third authentication data generated by said second electronic device to said first electronic device; and
i) comparing, in said first electronic device, said fourth authentication data generated by said first electronic device with said third authentication data transmitted form said second electronic device.

9. A mutual authentication method according to claim 8, wherein:
said first key data memory provided in said first electronic device includes a plurality of divided memory areas corresponding to application objects to store said plurality of first key data corresponding to said divided memory areas; and
said step b) comprises a step of obtaining said firs key data from one of said divided memory areas corresponding to one of said application objects.

10. A mutual authentication method according to claim 8, which further comprises a step of controlling said execution of said step d) according to a comparison result of said step i).

11. A mutual authentication method according to claim 10, wherein said first electronic device comprises storing means for previously storing first random data, and said method further comprises a step of generating second random data based on said first random data in said first electronic device.

12. A mutual authentication method according to claim 8, which further comprises a step of encrypting said first authentication base data to generate said second authentication base data in said first electronic device.

13. A mutual authentication system for authenticating a first electronic device and a second electronic device by transmitting authentication data between said first and second electronic devices, comprising:

first key data memory means provided on said first electronic device for storing a plurality of first key data designating data nd a plurality of associated key data;
second key data memory means provided on said second electronic device for storing a plurality of second key data designating data and a plurality of associated key data;
second processing means provided on said second electronic device for:
  a) transmitting first authentication base data and first key data designating data read form said second key data memory to said first electronic device; and
first processing means provided on said first electronic device for;
  b) generating first authentication data according to said transmitted firs authentication base data and first key data stored in said first key data memory means, sad first key data being associated with said transmitted first key data designating data; and
  c) transmitting said first authentication data; said second processing means further being provided for:
  d) reading out second key data from said second key data memory means storing said plurality of key data;
  e) generating second authentication data according to said first authentication base data and second key data read out from said second key data memory means, said second key data being associated with said first key data designating data; and
  f) comprising said first authentication data with said second authentication data in said first electronic device;
wherein said comprising function f) is executed without storing said first authentication data in said first electronic device.

14. A mutual authentication system according to claim 13, said first processing means being further provided for:
  g) generating second authentication base data according to said first authentication base data transmitted form said second electronic device;
  h) transmitting said second authentication base data and second key data designating data from said first electronic device to said second electronic device;
  i) generating third authentication data according to said generated second authentication base data nd third key data read form said first key data memory means, said third key data being associated with said second key designating data; and
said second processing means further being provided for:
  j) generating fourth authentication data according to said second authentication base data nd fourth key data read out from said second key data memory means, said fourth key data being associated with said transmitted second key data designating data; and
  k) transmitting said fourth authentication data to said first electronic device;

said first processing means further being provided for:

l) comprising said third authentication data with said fourth authentication data transmitted from said second electronic device.

15. A mutual authentication system according to claim 14, wherein said first key data memory means comprises a plurality of divided memory areas corresponding to application objects to store said plurality of first key data in association with said first key data designating data.

16. A mutual authentication system according to claim 15, said first processing means further being provided for:

m) changing said comparison function f) responsive to said comparison step l).

17. A mutual authentication system according to claim 13, said first processing means further being provided for:

g) encrypting said first authentication base data to generate said first authentication data in said first electronic device to be transmitted to said second electronic device.

18. A mutual authentication system according to claim 17, said first processing means further being provided for:

h) storing first random data transmitted from said second electronic device as said first authentication base data; and i) converting said first random data into second random data as said second authentication base data.

19. A mutual authentication system according to claim 18, said first processing means further being provided for:

j) storing said second random data.

* * * * *